United States Patent
Väänänen et al.

(10) Patent No.: US 8,441,434 B2
(45) Date of Patent: May 14, 2013

(54) USER OPERABLE POINTING DEVICE SUCH AS MOUSE

(75) Inventors: Johannes Väänänen, Oulu (FI); Juha Rytky, Oulu (FI)

(73) Assignee: Ball-IT Oy, Oulu (FI)

( * ) Notice: Subject to any disclaimer, the term of this patent is extended or adjusted under 35 U.S.C. 154(b) by 772 days.

(21) Appl. No.: 12/159,000

(22) PCT Filed: Dec. 19, 2006

(86) PCT No.: PCT/EP2006/069908
§ 371 (c)(1),
(2), (4) Date: Jun. 24, 2008

(87) PCT Pub. No.: WO2007/077124
PCT Pub. Date: Jul. 12, 2007

(65) Prior Publication Data
US 2009/0225030 A1 Sep. 10, 2009

(30) Foreign Application Priority Data
Dec. 31, 2005 (EP) .................................. 05028777

(51) Int. Cl.
*G09G 5/00* (2006.01)

(52) U.S. Cl.
USPC ........................................................ 345/156

(58) Field of Classification Search .................. 345/163, 345/164, 157
See application file for complete search history.

(56) References Cited

U.S. PATENT DOCUMENTS

| | | | | |
|---|---|---|---|---|
| 5,506,605 A | * | 4/1996 | Paley | 345/163 |
| 5,541,621 A | * | 7/1996 | Nmngani | 345/167 |
| 5,923,318 A | * | 7/1999 | Zhai et al. | 345/157 |
| 6,891,527 B1 | * | 5/2005 | Chapman et al. | 345/158 |
| D529,504 S | * | 10/2006 | Hughes | D14/406 |

(Continued)

FOREIGN PATENT DOCUMENTS

| | | |
|---|---|---|
| DE | 198 19 218 A1 | 7/1999 |
| EP | 0 789 321 A2 | 8/1997 |

(Continued)

OTHER PUBLICATIONS

Hidetoshi Nonaka and Tsutomu Da-te, "Ultrasonic Position Measurement and Its Applications to Human Interface," IEEE Transactions on Instrumentation and Measurement, vol. 44, No. 3, Jun. 1995.*

(Continued)

*Primary Examiner* — Yong H Sim
(74) *Attorney, Agent, or Firm* — Young & Thompson

(57) ABSTRACT

A user operable device for control of or communication with an electric appliance, in particular a user operable pointing device such as a mouse, including electrical components and circuits including sensor elements, processing elements and wireless communication elements for detecting movements including at least rotational movements of the device, producing data related to the movements and transmitting the data to the electric appliance, is characterized in that the device (1) is essentially a ball (2) including outer surface (2') for free rolling and for receiving influences of physical effects on the surface and the device, and that the electrical components and circuits (3, 4, 5, 6, 7, 8, 9, 10) are inside the ball (2) in integrated relationship with the ball. The invention concerns also a user interface including the user operable device of the invention.

17 Claims, 4 Drawing Sheets

U.S. PATENT DOCUMENTS

| | | | |
|---|---|---|---|
| 7,554,527 B2 * | 6/2009 | Howard et al. | 345/164 |
| 2002/0003527 A1 * | 1/2002 | Baker et al. | 345/156 |
| 2004/0183782 A1 * | 9/2004 | Shahoian et al. | 345/163 |
| 2004/0233167 A1 * | 11/2004 | Braun et al. | 345/163 |
| 2005/0093823 A1 * | 5/2005 | Hinckley et al. | 345/163 |
| 2005/0128186 A1 * | 6/2005 | Shahoian et al. | 345/161 |
| 2005/0273533 A1 * | 12/2005 | Hughes | 710/62 |
| 2006/0044275 A1 * | 3/2006 | Howard et al. | 345/164 |
| 2007/0211022 A1 * | 9/2007 | Boillot | 345/156 |
| 2009/0033630 A1 * | 2/2009 | Thelen | 345/173 |

FOREIGN PATENT DOCUMENTS

| | | |
|---|---|---|
| EP | 789321 A2 * | 8/1997 |
| JP | 1-28720 | 1/1989 |
| JP | 580932 | 4/1993 |
| JP | 7146751 A | 6/1995 |
| JP | 10293645 A | 11/1998 |
| JP | 2001501010 A | 1/2001 |
| JP | 2008502043 A | 1/2008 |
| WO | 97/39401 A | 10/1997 |
| WO | WO 9739401 A1 * | 10/1997 |
| WO | 00/30026 A | 5/2000 |
| WO | 00/63874 A | 10/2000 |
| WO | 01/43063 A1 | 6/2001 |
| WO | 2005/119431 A1 | 12/2005 |
| WO | 2005119431 A1 | 12/2005 |

OTHER PUBLICATIONS

Seongbae Lee; Gi-Joon Nam; Junseok Chae; Hanseup Kim; Drake, A.J., Two-dimensional position detection system with MEMS accelerometer for mouse applications, 2001, IEE Xplore, This paper appears in: Design Automation Conference, 2001. Proceedings Issue Date: 2001, on pp. 852-857, ISSN: 0738-100X, Print ISBN: 1-58113-297-2.*

Office Action, dated Apr. 8, 2011, in Application No. 2008125043/08(030347).

Japanese Office Action, dated Dec. 6, 2011, Application No. 2008-547948.

* cited by examiner

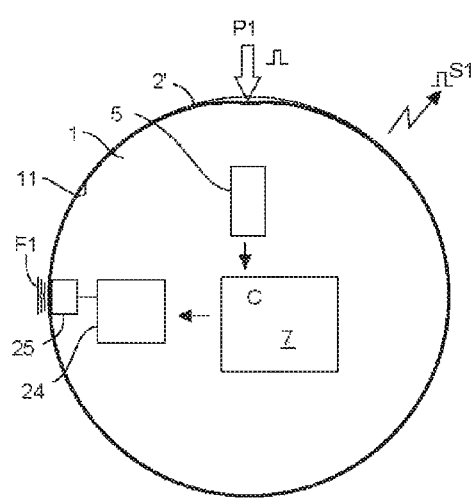
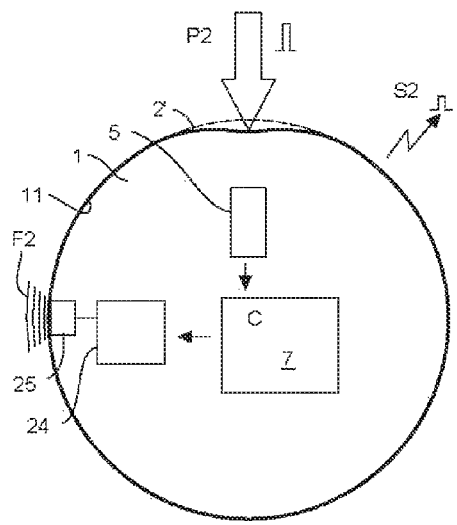
Fig. 7   Fig. 8
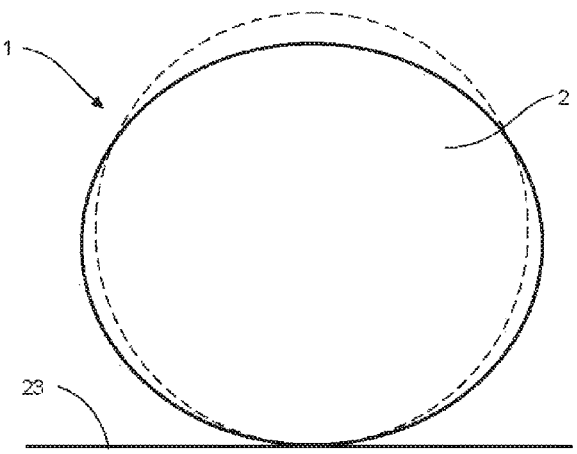
Fig. 9

USER OPERABLE POINTING DEVICE SUCH AS MOUSE

FIELD OF THE INVENTION

The present invention relates to a user operable device for control of or communication with an electric appliance, in particular to a user operable pointing device such as a mouse. The electric appliance may be a computer, PDA, mobile phone, GPS device, game device, television set, car entertainment system or personal exercise monitoring device, for example.

BACKGROUND OF THE INVENTION

One of the most common interfaces between a user and a computer or a computer controlled device is a conventional mouse detecting 2D movements of the mouse on a suitable flat surface and providing corresponding signals to a computer for moving a pointer on a display. Despite of that, a conventional mouse includes buttons for positioning a pointer, selecting data, opening and closing windows or menus for further selections, stating and closing programs or applications and entering commands in various situations. Furthermore, a computer mouse may include other functions, e.g. the scrolling function which is often realised by means of a scrolling wheel.

A mechanical mouse includes a ball inside the mouse frame, the bail being rolled on a flat surface and its movements being detected by sensors outside the ball. The technology is normally opto-mechanical or fully optical. In an optical mouse an optical sensor is monitoring microscopic features of a suitable surface to register motions of the mouse. The surface is lit with a LED, for example, and the sensor takes and compares successive images of the surface to detect the motions.

During recent years, also wireless technology have been applied to mice. In a widely used technology, a low-power, low-speed wireless link is formed between a mouse and a USB unit connected to a host computer. Today, Bluetooth technology is becoming a standard for wireless communication between electric devices. Bluetooth adapters connectable to USB connectors, for example, are available. Also computers and other electric devices with an integrated Bluetooth interface are available and this is becoming a standard solution, too. Accordingly, also mice provided with a Bluetooth interface are already available.

Various proposals have been presented to apply accelerometers, angular rate sensors, gyroscopes, generally speaking 3D motion detection, to computer mice, in many cases applying also wireless technology at the same time. Development of so called MEMS (Micro Electro Mechanical Systems) technologies offer good tools for realising above mentioned solutions. Such proposals have been made in U.S. Pat. No. 4,787,051, U.S. Pat. No. 4,839,838, U.S. Pat. No. 5,181,181, WO 01/90877 A1, US 2004/0066371 and EP 1103884 A1.

There have been problems to realise a computer mouse utilising accelerometers for motion detection. These problems may be overcome by using certain additional sensors and algorithms for processing the sensor data, for example.

Another problem is that the solutions still include a lot of separate parts assembled mechanically together to form the device. The devices using new technical solutions are more expensive than the conventional ones but, in fact, give no remarkable advantages.

In our opinion, the most serious problem is the lack of such a novel concept of a user operable device, e.g. mouse, which would make possible to utilise the above considered new technologies for realising a simple and low cost device which could be a new basic solution displacing the conventional mechanical and optical mice.

SUMMARY OF THE INVENTION

An object of the invention is to present a user operable device for control of or communication with an electric appliance, in particular a user operable pointing device such as a mouse, which to large extent solves the above mentioned problems.

To achieve this object, a user operable device for control of or communication with an electric appliance, in particular a user operable pointing device such as a mouse, comprising electrical components and circuits including sensor means, processing means and wireless communication means for detecting movements including at least rotational movements of the device, producing data related to said movements and transmitting said data to the electric appliance, is characterised in that which is defined in the characterising part of claim 1. Claims 2 to 8 define various embodiments of the user operable device of the invention.

To achieve this object, a user interface for control of or communication with an electric appliance comprising a user operable device including sensor means, processing means and wireless communication means for detecting movements including at least rotational movements of the device, producing data related to said movements and transmitting said data to the electric appliance, is characterised in that which is defined in the characterising part of claim 9. Claims 10 to 13 define various embodiments of the user interface of the invention.

The device of the invention is very cheap to manufacture, The mechanics of the device is very simple and durable. The ball shape is ideal in rigidity versus weight. There are only a few components which will all be basic standard components in the electronics industry. When high-volume mass production starts, it will become economically possible to integrate the most of the needed components in a special Bluetooth unit, and the manufacturing costs may be even lower.

The device of the invention is basically a Bluetooth enabled versatile sensor package which may have many other applications as a user operable control or communication device.

BRIEF DESCRIPTION OF THE DRAWINGS

The invention and some embodiments thereof are described in further detail in the following with reference to the accompanying drawings, in which:

FIGS. 7 and 8 present schematically some further embodiments of the invention;

FIG. 9 presents a farther embodiment of the invention; and

DETAILED DESCRIPTION OF THE INVENTION

Figure 1:
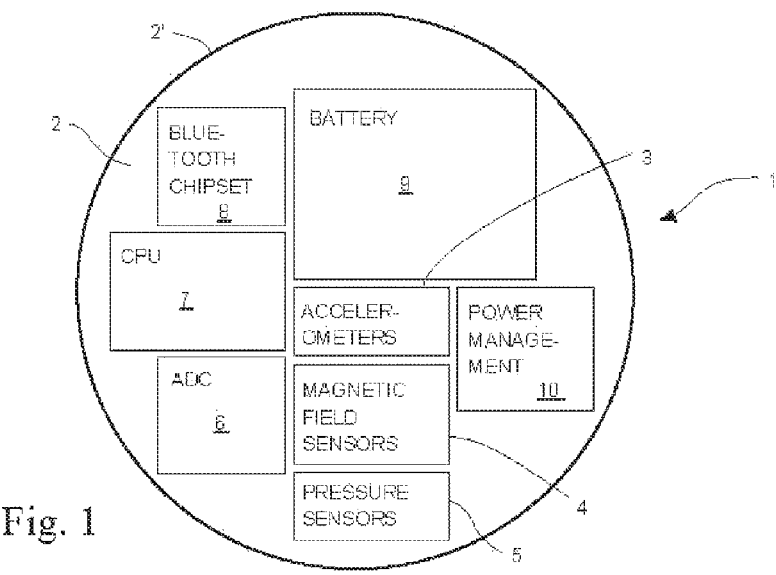
FIG. 1 is a schematic block diagram presenting schematically an embodiment of the user operable device according to the invention.

A user operable device 1 presented in FIGS. 1 to 4 is essentially a ball 2 including an outer surface 2' for free rolling and for receiving influences of physical effects on the surface and the device. The device, e.g. a user operable pointing device such as a mouse, comprises electrical components and circuits including sensor means 3, 4, 5, processing means 7 and wireless communication means 8 for detecting movements including at least rotational movements of the device, producing data related to said movements and transmitting said data to an electric appliance for control of or communication with the appliance. The device 1 is an independently operating ball shaped device having necessary physical properties and sensors and electrical components and circuits inside the ball 1 in integrated relationship with the ball, so that the ball as such works as a user operable device for control of or communication with electric appliances.

The device 1 of FIGS. 1 to 4 includes inside the ball 2 various sensors including accelerometers 3, magnetic field sensors 4 and pressure sensors 5. The accelerometers 3 may include e.g. a 3-axis MEMS accelerometer. The magnetic field sensors 4 include three low power single axis magnetometers 4a, 4b and 4c, which may be e.g. low cost fluxgate magnetometers. The pressure sensors 5 may be miniature piezoresistive sensors, for example.

Sensor components may include also electronics for giving digital sensor outputs, and various other electronic circuits may be necessary for converting the sensor outputs into digital data for further processing and utilisation. The necessary ADC circuitry and other electronic circuits for processing the sensor outputs are presented here as a one unit 6.

The central processing unit 7 includes a suitable processor with necessary memories for saving programs and data. The programs provide, for example, necessary filtering functions for processing the sensor data for separating the essential data from noise and calculation functions for obtaining the desired data from the sensor data related to motions, pressure changes or other physical effects detected by the sensors.

The link between the device 1 and the electric appliance in connection with which it is used is wireless. An advantageous technology for realising the link is Bluetooth, and accordingly the exemplary device of FIGS. 1 to 4 includes a suitable Bluetooth chipset 8.

The device of FIGS. 1 to 4 includes a rechargeable battery 9 and necessary power management circuits 10.

Figures 2, 3:
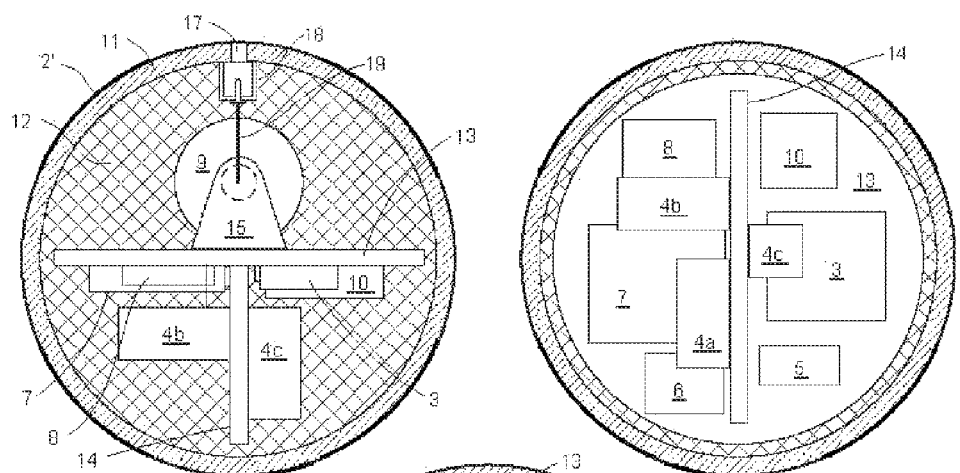
FIGS. 2 to 4 are, respectively, partly sectional plant, front and side views presenting schematically a possible realisation of the device of FIG. 1.
Figure 4:
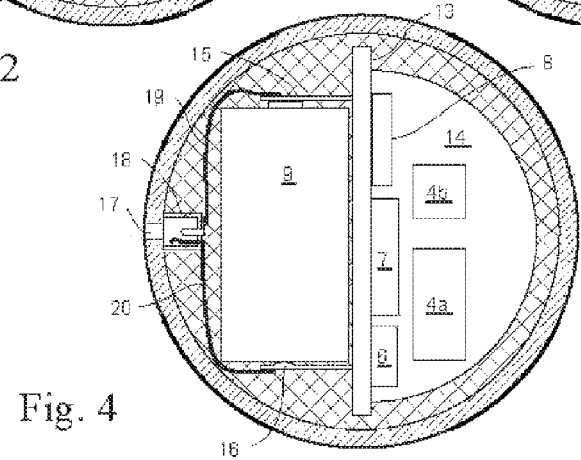

In the schematically presented physical realisation of FIGS. 2 to 4, the ball 2 is a hollow ball provided with a strongly built, thick enough and suitably flexible spherical jacket 11. It may be made of suitable rubber or plastic material and may include originally two halves which are after the assembly of the inside components and circuits attached to each other by gluing, for example. The components have been assembled on a printed circuit board 13, the magnetic field sensors 4a and 4b being attached on an auxiliary printed circuit board 14 connected as a single-in-line unit on the board 13. The battery 9 is attached mechanically and electrically on the other side of the printed circuit board 13 by means of terminal plates or springs 15 and 16. The spherical jacket 11 is provided with a hole 17 which is in alignment with an inner charging connector 18 which is connected to the terminals of the battery by means of leads 19 and 20. The hollow space inside the jacket is filled with suitable filler material 12, e.g. plastic foam material. The jacket is essentially air tight and, accordingly, e.g. a push on the outer surface 2' of the ball F causes a rise of the pressure inside the ball.

Figure 5:
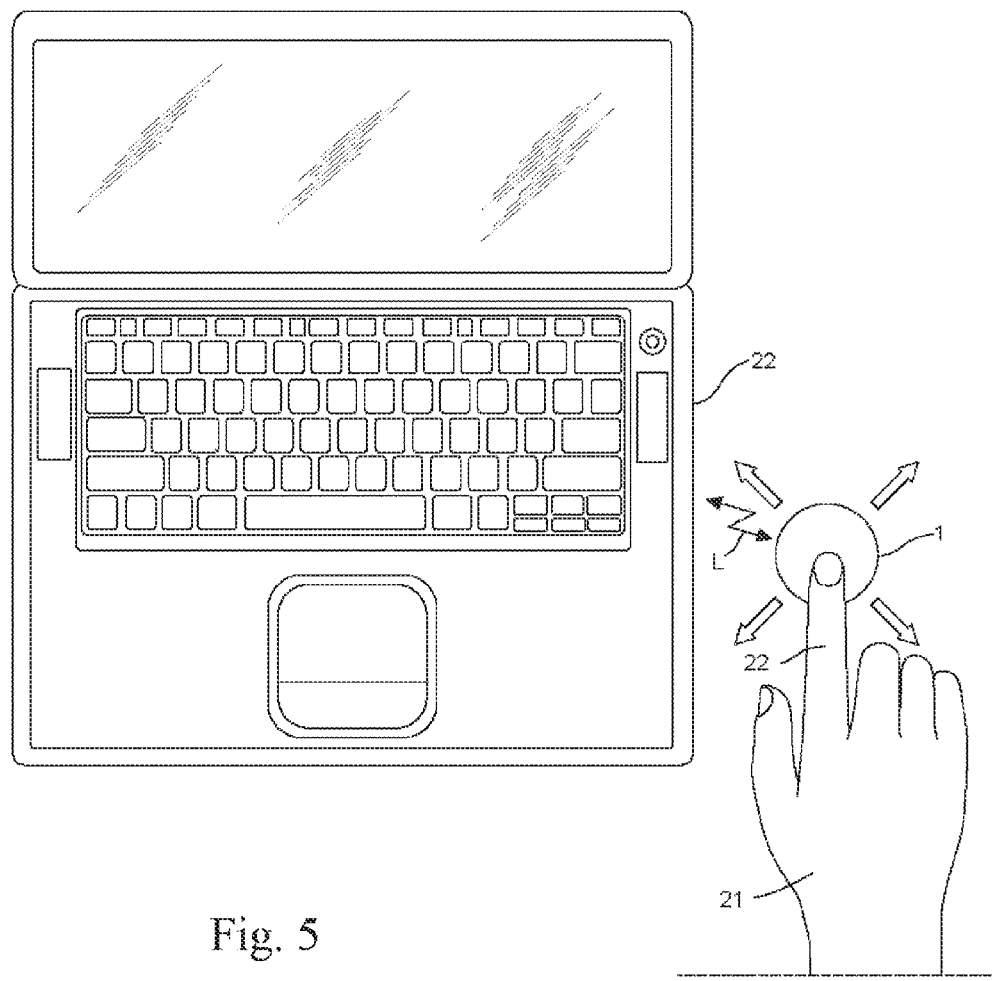
FIGS. 5 and 6 illustrate possible ways of using the device according to the invention.
Figure 6:
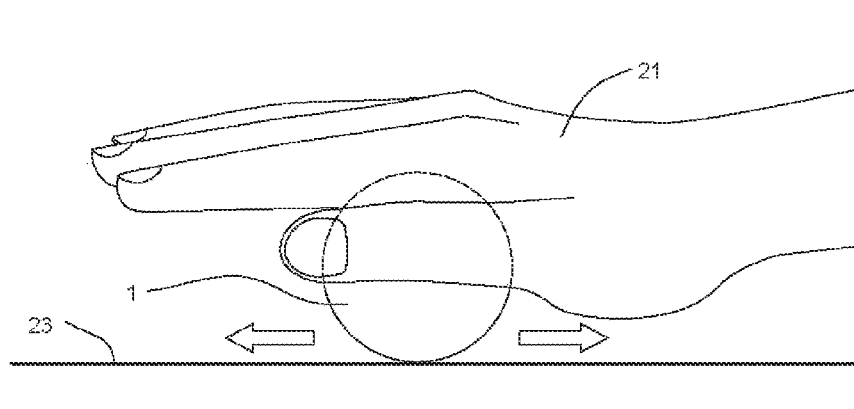

A primary use of the device of the invention is a user operable pointing device such as a mouse. FIG. 5 presents a laptop computer 22 including a display and functions for controlling the computer by a computer mouse or similar device. Such functions for controlling include e.g. cursor and scrolling functions. The ball device 1 according to the invention is used as a mouse. The user 21 uses the ball 1 by moving it with a finger 22, and the ball sends mouse control data produced by moving and selectively pressing the ball via a wireless link L. The ball may be controlled also by means of the palm of the hand 21 on a suitable surface 23, as in FIG. 6.

FIGS. 7 and 8 present schematically one possible way of realising some mouse button functions in the device of the invention. In FIG. 7, a quite light push P1 on the surface 2' of the ball device 1 causes a pressure inside the ball which is relative to the strength of the push. The pressure sensor 5 detects it and gives a corresponding signal to the processor 7. The device includes also an amplifier 24 and a transducer 25 attached to the jacket 11 of the ball device. In response to the pressure pulse, the processor controls the amplifier 24 and the transducer to produce a haptic feedback F1, a short low energy vibration pulse. The ball 1 sends a corresponding control signal S1 to the controlled device, e.g. a computer, meaning a click of the Left button of the mouse, for example. In FIG. 8, the push P2 is stronger. Accordingly, the processor 7 controls the device to send a corresponding control signal S2 meaning a click of the right button of the mouse, for example, and to give a corresponding stronger haptic feedback F2.

Figure 10:
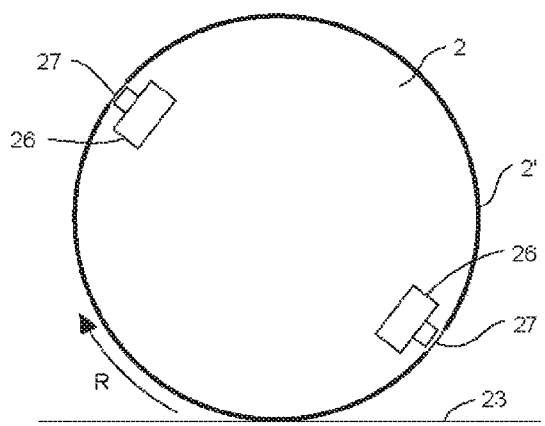
FIGS. 10 to 12 present schematically some further embodiments of the user operable device according to the invention.
Figure 11:
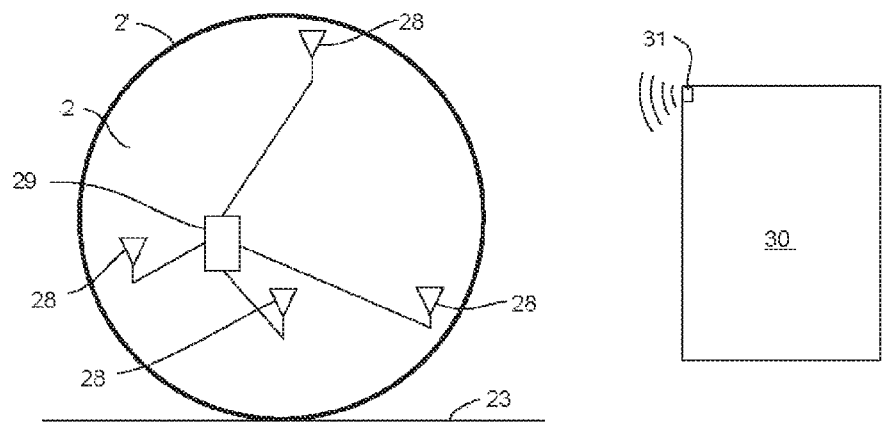
Figure 12:
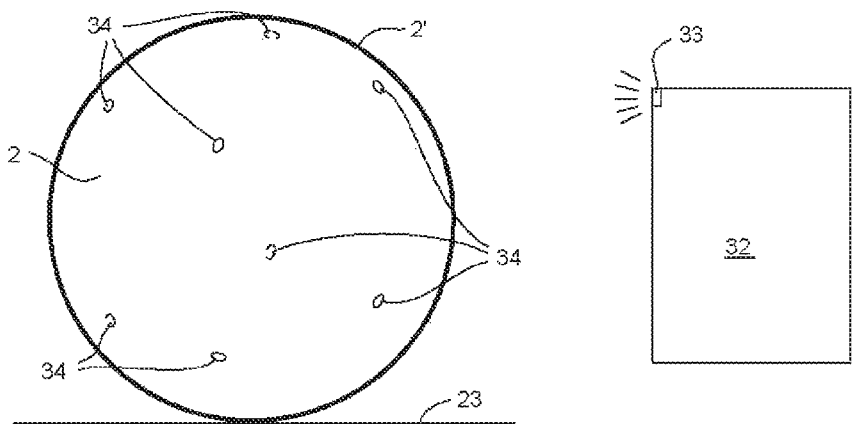

FIGS. 10 to 12 present schematically some further examples of sensor arrangements which may be used for detecting the rotational and other movements of the device.

In the example of FIG. 10, the device 2 includes miniature video cameras 26 to picture the environment through suitable windows 27 in the surface 2' of the ball. E.g. the speed and direction of a rotational movement R of the ball may be determined by processing the picture data given by the cameras.

In the example of FIG. 11 there is a RF transmitter 31, e.g. a Bluetooth transmitter, in an electric appliance 30, e.g. a computer, and inside the ball 2 there is an arrangement of several antennas 28 and circuitry 29 for processing the signals provided by the antennas. The position of the ball may be calculated from the time differences in receiving a signal from the transmitter 31 to different antennas 28, and by analysing the sequences of the ball positions the movements of the ball may be obtained.

In the example of FIG. 12 there is a light transmitter 33, e.g. a suitable LED, in an electric appliance 32, e.g. a computer, and inside the ball there are several light receptors 34 behind small windows or for the light of the transmitter 33 transparent surface 2' of the ball. The position of the ball may be calculated from the time differences in receiving a light signal from the transmitter 33 to different receptors 34, and by analysing the sequences of the ball positions, the movements of the ball may be obtained.

In the following two examples of the operation of the device according to the invention are described.

Example 1

Step 1: The CPU 7 opens or otherwise establishes a communication channel to the electric appliance to be controlled. The appliance may be a computer, mobile phone, PDA, data projector, toy, TV set, car, for example. Step 1 may be skipped if the appliance or the used communication method does not require initialisation.

Step 2: The CPU 7 establishes reference direction of the movement of the ball device. It can be done via a user input by shortly rotating the apparatus to a pre-determined direction or by placing the apparatus on a certain "start orientation" where some visible clues of the orientation of the ball are viewed by the user, for example.

Step 3: The CPU 7 reads sensor data obtained from the sensors 3, 4 and 5, Step 4: The CPU 7 performs the necessary filtering functions to process the sensor data for separating the essential data from noise.

Step 5: The CPU 7 calculates the movement values of the ball device from the essential sensor data, This is done by converting accelerometer and magnetic field orientation values into a motion and rotational co-ordinates of the device. These co-ordinates are converted to mouse movement co-ordinates, for example.

Step 6: The CPU 7 calculates the pressure from the pressure sensor data and determines if the user wished to activate or deactivate a corresponding function, e.g. a mouse button function.

Step 7: The CPU 7 sends the calculated ball device movement values and other function values, e.g. status values, via the communication channel to the receiving electric appliance.

Step 8: Loop back to step 3.

Some or all functions of the CPU 7 may also be realised with the CPU of the electric appliance. For example in one embodiment the user operable device relays only sensor data, and all calculations related to coordinate systems and/or reference directions are computed at the CPU of the electric appliance. Naturally any distribution of tasks between the CPU 7 of the user operable device and the CPU of the electric appliance is possible and within the realm of the invention.

Accordingly, the user operable device of the invention may work as a device corresponding to a conventional computer mouse in an interface between a computer or computer controlled electric appliance and a user. The ball device needs then a reference orientation which may be set in the way described above in step 2, for example. Rolling the device on an underlying surface corresponds then to normal mouse movements on a surface. Pushes may correspond to mouse button functions as described above in step 6 and earlier with reference to FIGS. 7 and 8. E.g. pressing and rolling the device simultaneously may correspond to dragging function, and spinning motion (rotating the device in place around the axis perpendicular to the underlying surface) may correspond to scrolling function.

Example 2

This example describes the operation of the ball device as a user operable device for measuring a distance and sending the measurement results to a suitable electric appliance.

Step 1: The CPU 7 opens or otherwise establishes a communication channel to a receiving electric appliance. Step 1 may be skipped if the receiving device or the used communication method does not require initialisation.

Step 2: The CPU 7 reads sensor data obtained from the sensors 3, 4 and 5.

Step 3: The CPU 7 performs the necessary filtering functions to process the sensor data for separating the essential data from noise.

Step 4: The CPU 7 calculates the movement values of the ball device from the essential sensor data. This is done by converting accelerometer or magnetic field orientation values into motion and rotational co-ordinates of the device.

Step 5: The CPU sends the calculated ball device movement values via the communication channel to the receiving electric appliance.

Step 8: Loop back to step 2.

The invention is not restricted to the embodiments described above. E.g. the ball structure can be also hollow or partially hollow, With reference to FIG. 9, the ball structure 2 can also be flexible in a way that the device 1 may to some extent oblate in the use on a suitable surface 23. The expression "the device is essentially a ball" used here to define the properties of the ball includes also this possibility.

The electrical components inside the ball can be assembled also on a flexible printed circuit board or the inner surface of the ball jacket, for example. For assembling the device, there may be also some other plastic structure with electrical wiring or any combination of the described or mentioned alternatives.

The sensors mentioned above are only exemplary. There may be also gyroscope sensors, for example. Capacitive sensing on the surface of the ball, or any other sensors to determine rotation, orientation, location, pressure inside or object on outer surface of the ball may possibly be used for realising various embodiments of the invention.

Other wireless communication links than Bluetooth technology are, of course, possible. Instead of RF link, the link may be also optical, e.g. infra-red link like IrDA. It is most desirable that the ball device could be self-powering or inductively charged. In the future, such alternatives would most probably become available for also low cost applications.

The invention may vary within the scope of the accompanying claims.

The invention claimed is:

1. A user operable device for control of or communication with an electric appliance, comprising:
  a ball including an outer surface for free rolling on an underlying surface to displace the ball along a length of the underlying surface corresponding to a mouse movement on the underlying surface and for receiving influences of physical effects on the outer surface and the ball obtained from the rolling on the underlying surface; and
  a sensor part, a processor part, and a wireless communication part that detect movements of the ball on the underlying surface including at least rotational movements of the ball on the underlying surface, produce data related to said movements and transmit said data to the electric appliance being controlled,
  said sensor part, said processor part, and said wireless communication part located inside the ball (2) in integrated relationship with the ball,
  said sensor part comprising
  i) at least one magnetic field sensor for detecting an orientation of the ball with respect to the underlying surface and providing orientation data in the form of magnetic field orientation values,
  ii) at least one pressure sensor for detecting at least a first pressure and a greater second pressure directed on said outer surface, and
  iii) at least one accelerometer (3) providing accelerometer values during the rolling of the ball on the underlying surface,
  said processor part comprising a CPU that establishes a reference direction of the movement of the ball via a user input by rotating the ball to a pre-determined direction or by placing the ball on a certain start orientation where a visible clue of the orientation of the ball is viewed by the user, wherein rolling the ball on the underlying surface corresponds to 2-D movements of a mouse on a surface, and data corresponding to the mouse 2-D movements is sent to the appliance, the processor part calculating movement values of the ball along the underlying surface by converting the accelerometer values and the magnetic field orientation values into a motion and rotational co-ordinates of the ball, said accelerometer is placed to the center of gravity of said user operable device and said magnetic sensor is positioned to the half of the device with the least amount of electrical wires, said device configured for use as a motion-controlled device for a game device and as a computer mouse.

2. The device of claim 1, wherein the ball is made of one of rubber and plastic.

3. The device of claim 1, wherein the outer surface is elastic for producing perceptible response to pushes with variable forces.

4. The device of claim 1, wherein the ball is flexible for making the outer surface oblate against a hard surface.

5. The device of claim 1, further comprising means for producing haptic feedback.

6. A user interface for control of or communication with an electric appliance comprising:
　a user operable device; and
　an electric appliance including
　a) a display and corresponding cursor functions located on the electric appliance, and
　b) function parts controlling the appliance in response to the user operable device, wherein,
　the user operable device includes
　a) a ball with an outer surface for free rolling on an underlying surface to displace the ball along a length of the underlying surface corresponding to a mouse movement on the underlying surface and for receiving influences of physical effects on the outer surface and the ball,
　b) electrical components and circuits including sensor means, processing means and wireless communication means for detecting movements including at least rotational movements of the ball, producing data related to said movements and transmitting said data to the electric appliance, said electrical components and circuits being inside the ball in integrated relationship with the ball,
　said electrical components and circuits arranged so that in response to rolling the ball, data is transmitted to the electric appliance for moving a cursor on the display in a direction corresponding to the rolling direction of the ball, and
　said electrical components and circuits are arranged so that in response to pushes on the surface, data corresponding to mouse button operations is transmitted to the electric appliance, wherein,
　said sensor means includes
　i) at least one magnetic field sensor for detecting the orientation of the ball and providing orientation data with respect to the underlying surface, the orientation data in the form of magnetic field orientation values,
　ii) at least one pressure sensor for detecting pressure directed on said outer surface,
　iii) at least one accelerometer (3) providing accelerometer values during the rolling of the ball on the underlying surface, and
　a CPU arranged to establish a reference direction of the movement of the ball via a user input by rotating the ball to a pre-determined direction or by placing the ball on a certain start orientation where a visible clue of the orientation of the ball is viewed by the user, wherein rolling the ball on an underlying surface corresponds to 2-D movements of a mouse on a surface, and data corresponding to the mouse 2-D movements is sent to the appliance, and the CPU calculating movement values of the ball on the underlying surface by converting the accelerometer values and the magnetic field orientation values into a motion and rotational co-ordinates of the ball, said accelerometer being placed to the center of gravity of said user operable device and said magnetic sensor being positioned to the half of the device with the least amount of electrical wires.

7. A user interface of claim 6 wherein said electrical components and circuits are arranged so that in response to pressing and rolling the device simultaneously, data corresponding a dragging function is transmitted to the electric appliance.

8. A user interface of claim 6 wherein said electrical components and circuits are arranged so that in response to a spinning motion rotating the ball in place around an axis perpendicular to the underlying surface, data that corresponds to a scrolling function is transmitted to the electric appliance.

9. A user operable device for control of or communication with an electric appliance, comprising:
　a ball including a flexible spherical jacket defining an outer surface, the ball being free rolling on an underlying surface to displace the ball along a length of the underlying surface corresponding to a mouse movement on the underlying surface and adapted for receiving influences of physical effects on the surface;
　sensor parts, a processing part, and wireless communication part operatively arranged to i) detect movements, including at least rotational movements of the ball, ii) produced data related to said detected movements, and iii) transmit said data to an electric appliance for control of or communication with the appliance,
　said sensor parts, said processing part, and said wireless communication part located inside the ball in an integrated relationship with the ball, so that the ball works as a user operable device for control of or communication with the electric appliance,
　said sensor part comprising i) a magnetic field sensor for detecting an orientation of the ball with respect to the underlying surface and providing orientation data in the form of magnetic field orientation values, the orientation data used in operation of the device, ii) a pressure sensor for detecting pressure directed on said outer surface, and iii) an accelerometer providing accelerometer values during the rolling of the ball on the underlying surface,
　said processor part comprising a processor that establishes a reference direction of the movement of the ball via a user input by one of i) rotating the ball in a pre-determined direction and ii) by placing the ball on a certain start orientation indicated by visible orientation of the ball as viewed by the user,
　wherein rolling the ball on an underlying surface corresponds to 2-D movements of a mouse on a surface, and data corresponding to the mouse 2-D movements is sent to the appliance, the processor part calculating movement values of the ball along the underlying surface by converting the accelerometer values and the magnetic field orientation values into a motion and rotational co-ordinates of the ball, said accelerometer is placed to the center of gravity of said user operable device and said magnetic sensor is positioned to the half of the device with the least amount of electrical wires.

10. The device of claim 9, wherein the pressure sensor detects a first pressure applied to the outer surface as corresponding to a left mouse click and a second, greater pressure applied to the outer surface as corresponding to a right mouse click, with corresponding data being sent to the appliance, said device configured for use as a motion-controlled device for a game device and as a computer mouse.

11. The device of claim 9, wherein,
the sensor parts further comprises a video camera located within the ball and arranged to detect a surrounding environment of the ball through a window in the surface of the ball, and
a speed and direction of a rotational movement of the ball is determined by processing the picture data given by the camera.

12. The device of claim 9, wherein,
the sensor parts further comprise plural antennas, and
the position of the ball is calculated from time differences in receiving signals from the transmitter to plural antennas.

13. The device of claim 9, wherein the reference direction of the movement of the ball is established by the user rotating the ball in a pre-determined direction.

14. The device of claim 9, wherein the reference direction of the movement of the ball is established by the user placing the ball on a certain start orientation indicated by visible orientation of the ball as viewed by the user.

15. The device of claim 9, wherein the jacket is made of one of rubber and plastic.

16. The device of claim 9, wherein the ball is flexible, allowing the outer surface to be made oblate against a hard surface.

17. The device of claim 9, further comprising haptic feedback elements.

* * * * *

UNITED STATES PATENT AND TRADEMARK OFFICE
CERTIFICATE OF CORRECTION

PATENT NO. : 8,441,434 B2  Page 1 of 1
APPLICATION NO. : 12/159000
DATED : May 14, 2013
INVENTOR(S) : Väänänen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this
Eighth Day of September, 2015

Michelle K. Lee
*Director of the United States Patent and Trademark Office*